United States Patent
Reuber et al.

(10) Patent No.: US 6,296,086 B1
(45) Date of Patent: Oct. 2, 2001

(54) MOTOR VEHICLE BRAKING DEVICE

(75) Inventors: Gerhard Reuber, Drolshagen; Rolf Weiler, Eppstein; Claus-Peter Panek, Steinbach, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/554,777

(22) PCT Filed: Nov. 5, 1998

(86) PCT No.: PCT/EP98/07075

§ 371 Date: Aug. 4, 2000

§ 102(e) Date: Aug. 4, 2000

(87) PCT Pub. No.: WO99/27269

PCT Pub. Date: Jun. 3, 1999

(30) Foreign Application Priority Data

Nov. 22, 1997 (DE) .............................. 197 51 915

(51) Int. Cl.[7] ...................................... F16D 65/10
(52) U.S. Cl. ............................................. 188/218 A
(58) Field of Search .............................. 188/18 A, 218 A, 188/206 A, 206 R, 328

(56) References Cited

U.S. PATENT DOCUMENTS 4,494,630 * 1/1985 Stoka et al. .......................... 188/71.8
5,896,958 * 4/1999 Ludke et al. ...................... 188/206 A

FOREIGN PATENT DOCUMENTS

| 70 00 210 | 4/1970 | (DE) . |
| 24 32 728 | 5/1976 | (DE) . |
| 38 24 917 | 1/1990 | (DE) . |
| 43 44 051 | 7/1994 | (DE) . |
| 15 89 121 | 5/1981 | (GB) . |
| 6 79 724 | 1/1965 | (IT) . |
| 08 270688 | 10/1996 | (JP) . |
| 10 246256 | 9/1998 | (JP) . |

* cited by examiner

Primary Examiner—Christopher P. Schwartz
(74) Attorney, Agent, or Firm—Rader, Fishman & Grauer PLLC

(57) ABSTRACT

The present invention discloses a brake device for the wheels of an automotive vehicle which includes a wheel-sided brake drum and a vehicle-sided mud guard that engages in a non-contact manner with a circumferential web into an annular recess in the end surface of the brake drum opposite the mud guard in order to provide a labyrinth-type seal. In conventional brake devices, the mud guard along with a welded annular web typically has a two-part design. In contrast thereto, the present invention proposes that the mud guard be punched and deep drawn from sheet metal and that the circumferential web be integrally designed with the mud guard by noncutting shaping.

3 Claims, 1 Drawing Sheet

MOTOR VEHICLE BRAKING DEVICE

TECHNICAL FIELD

The present invention generally relates to vehicle brake systems and more particularly relates to a brake device for the wheels of an automotive vehicle.

BACKGROUND OF THE INVENTION

The brake shoes and the parts necessary for their operation in brake devices of this type are arranged in the space which is defined by the brake drum which rotates with the wheel on one side and the mud guard on the vehicle which is stationary in relation to the wheel. To protect these parts, attempts have been made to provide a maximum tight sealing between the wheel-sided brake drum and the vehicle-sided mud guard as a protection of the parts against contaminants and spray water.

German patent application No. 38 24 917 discloses various embodiments of a labyrinth-type sealing which are all based on the fact that an annular web is welded to the mud guard. This type of manufacture is not only comparatively expensive because the mud guard and the annular web must be joined in a special working step, it also involves major shortcomings with regard to manufacture. This is because the mud guard, which frequently has a rather complicated shape, and the annular web inhere inner tensions caused in mechanical working operations. The tensions are diminished to an uncontrollable extent in heating, which is inevitable during welding processes, and cause deformations of the component parts. Therefore, prior art mud guards with an annular web welded thereto regularly necessitate finishing operations in order to maintain the predetermined close manufacturing tolerances and to prevent rejecting a large quantity of parts as useless. Thus, the prior art mud guards necessitate a very complicated manufacture due to the required welding operation, on the one hand, and the resulting testing and finishing process steps, on the other hand.

An object of the present invention is to disclose a brake device of the above-mentioned type which, in comparison, permits manufacture at considerably lower costs and obviates the need for costly testing and finishing operations, in particular in the manufacture of mud guards.

According to the present invention, this object is achieved in that the mud guard is made of a sheet-metal part in punching and deepdrawing operations, and in that the circumferential web is integrally designed with the mud guard by noncutting shaping. The reason for this is that when the annular web in manufacture directly from the sheet-metal portion for the mud guard, the welding operation with all mentioned shortcomings will be omitted. Surprisingly, it has shown that this object can be achieved by making use of the presently available noncutting shaping techniques and that a mud guard may thus be provided, wherein the annular web is designed integrally with the other parts of the mud guard. A ready-to-mount mud guard is provided at the end of the shaping operations which does not require finishing. The shaping of the annular web can be brought into line with the shaping required in view of other functions of the mud guard. Thus, a mud guard with an annular web can be furnished which eliminates disadvantages compared to conventional embodiments.

DETAILED DESCRIPTION OF THE PREFERRED EMBODIMENTS

Figure 2:
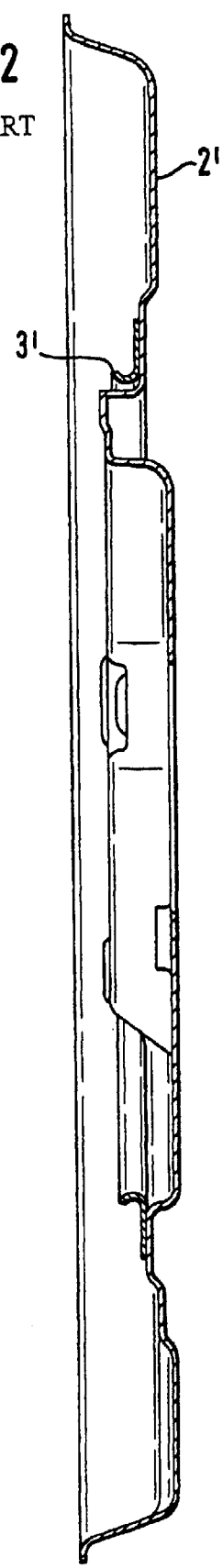
FIG. 2 is a prior art mud guard.

The FIG. 2 embodiment shows a cross-sectional view of a conventional mud guard for a respective brake device. With respect to the invention which shall be explained hereinbelow, it is only of importance that a separately manufactured annular web 3' is connected to the actual mud guard member 2' by welding, soldering, or similar methods.

In the embodiment of the mud guard according to the present invention, the annular web 3 is shaped integrally from the material of the mud guard 2. In the bottom half of the drawing, the radially inward half web 3a is arranged directly adjacent the radially outward half web 3b. This web cross-section extends over part of the circumference of the mud guard 2. It engages into a recess 4 which is provided in the end surface 5 of the brake drum 1. The recess 4 can be arranged at the edge of the brake drum end surface 5 and as a (non-illustrated) circumferential annular groove inside the brake drum end surface 5, for example.

In the top part of the illustration, the two half webs 3c and 3d of the annular web 3 are farther moved apart radially and interconnected by a sheet-metal portion 6 which extends in parallel to the main plane of the mud guard. The radially outward half web 3d engages into the recess 4 of the brake drum 1 which is defined by a cylindrical partial surface 4a and a partial surface 4b which extends in parallel to the main plane of the mud guard 2. In this arrangement, the half web 3d is inclined relative to the main plane of the mud guard 2, with the result of a circumferential groove between the half web 3d and the mud guard 2 permitting the discharge of dirt and water.

Figure 1:
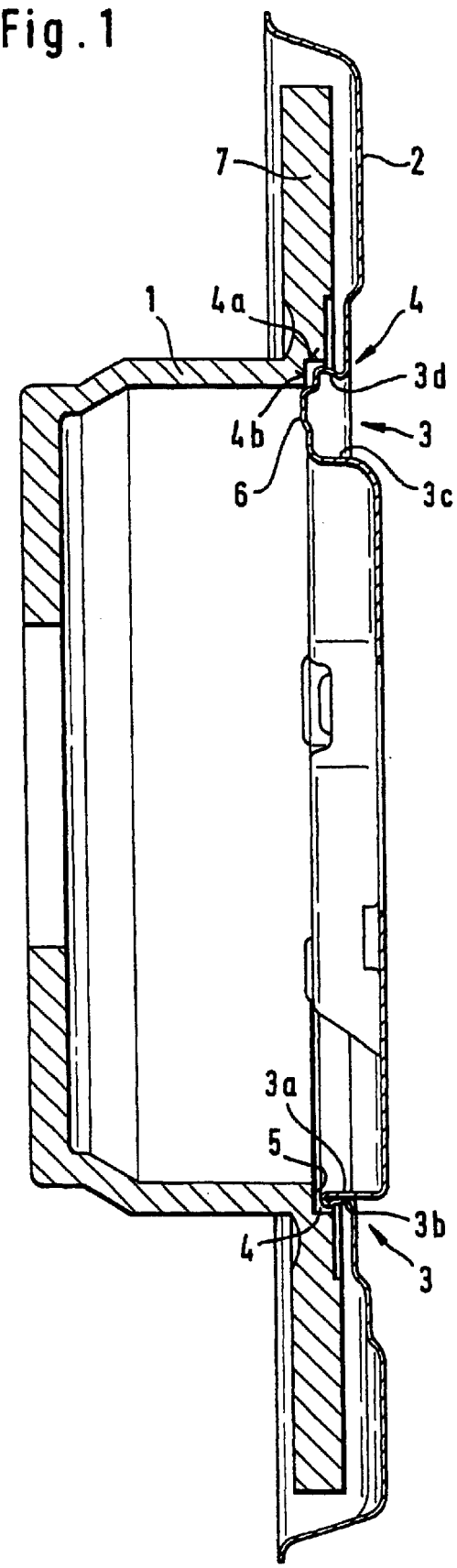
FIG. 1 is the mud guard of the present invention.

In the embodiment of FIG. 1, the brake drum 1 is integrally designed with brake disc 7. Brake disc 7 is included in the part of the brake device which is used as a service brake, and the brake drum is included in the part of the brake device which is used as a parking brake.

The idea of the present invention is, not only applicable in combined brake devices of this type but at any locations where the objective is to cover an inside space of a brake device by a mud guard and to achieve a maximum tight non-contact sealing between the component part which rotates along with the wheel and the non-rotating mud guard on the vehicle.

What is claimed is:

1. A brake device for the wheels of an automotive vehicle that includes a wheel-sided brake drum, comprising:
   a mud guard made of sheet metal by punching and deepdrawing operations, wherein said mud guard includes a circumferential web that is integrally designed with said mud guard by noncutting shaping on at least a part of said mud guard's circumference, wherein said web is comprised of a double layer of material that projects vertically in relation to a main plane of said mud guard and is formed from a radially inward half web and from a radially outward half web.

2. A brake device for the wheels of an automotive vehicle that includes a wheel-sided brake drum, comprising:
   a mud guard made of sheet metal by punching and deepdrawing operations, wherein said mud guard includes a circumferential web that is integrally designed with said mud guard by noncutting shaping on at least a part of a circumference of said mud guard, wherein said mud guard includes a radially inward half web and spaced therefrom a radially outward half web, wherein both of said half webs extend substantially vertical to a main plane of said mud guard, and wherein a sheet-metal portion is interposed between said half webs, said sheet metal portion generally extending in a plane.

3. A brake device as claimed in claim 2, wherein said radially outward half web, when viewed in a cross-section, extends in a conically outwardly expanding fashion from said main plane of said mud guard and passes in a rounded fashion into said main plane of said mud guard and into a parallel plane of said sheet-metal portion.

* * * * *